United States Patent [19]

Pringle

[11] 4,187,777
[45] Feb. 12, 1980

[54] APPARATUS FOR BONDING BRAKE LININGS

[75] Inventor: William L. Pringle, Grosse Pointe Shores, Mich.

[73] Assignee: Leonard Friedman, Beverly Hills, Calif.

[21] Appl. No.: 960,456

[22] Filed: Nov. 13, 1978

[51] Int. Cl.² .................... B30B 15/04; B30B 13/34
[52] U.S. Cl. .................... 100/93 PB; 269/321 B; 156/583.8
[58] Field of Search .............. 100/93 PB; 269/321 B, 269/228, 287, 56, 13, 481, 218, 268; 156/228, 581, 583.8, 583.9

[56] References Cited
U.S. PATENT DOCUMENTS

| 2,616,480 | 11/1952 | Barrett | 100/93 PB |
| 2,982,332 | 5/1961 | Garrett | 269/321 B |
| 3,434,412 | 3/1969 | Katz | 100/93 PB |
| 3,638,560 | 2/1972 | Morgan, Sr. et al. | 269/321 B |

Primary Examiner—Peter Feldman
Attorney, Agent, or Firm—Barnes, Kisselle, Raisch & Choate

[57] ABSTRACT

An apparatus for bonding brake linings having a plurality of fixtures on a conveyor. Pairs of linings and brake shoes with a bonding material therebetween are releasably clamped in each fixture between a load ring and a pair of generally opposed pressure block assemblies. The bonding material is heated to an elevated curing temperature in each fixture by electric heater elements disposed in the block assemblies. The heated fixtures and shoes are cooled by a stream of air at ambient temperature produced by a blower and the brake shoes are clamped in and released from the fixtures by press assemblies associated with the conveyor.

23 Claims, 9 Drawing Figures

APPARATUS FOR BONDING BRAKE LININGS

This invention relates to a bonding apparatus and more particularly to an apparatus for bonding brake linings to the tables of brake shoes.

A brake block or lining has been previously secured to the lining table of a brake shoe by interposing a bonding material between the lining and shoe and curing the bonding material under heat and pressure to adhere the lining to the table of the shoe. This bonding has been previously accomplished by placing the table and lining with a suitable bonding material therebetween under pressure in an appropriate fixture and passing the fixture with the lining and shoe therein through a heating furnace to raise the temperature of the bonding material to its curing temperature and thereafter cooling the fixture with the brake shoe and liner therein in either ambient air or a hot water quench. Suitable previously known fixtures for applying pressure to the brake shoe and lining are shown in unexpired U.S. Pat. Nos. 3,638,560 and 3,752,062.

The prior practice of utilizing such fixtures and a conventional gas fired furnace to bond liners to the tables of shoes has required substantial hand labor and maintenance of an elevated temperature in the range from approximately 500° to 600° F. for a substantial period of time in order to heat the bonding material to a curing temperature in the range of about 390° to 450° F. Both of these factors have made the prior bonding of brake linings a relatively expensive and time consuming operation which requires a substantial capital investment in fixtures, furnaces, conveyors and other manufacturing equipment.

Objects of this invention are to provide a comparatively inexpensive automated apparatus for bonding brake linings to the tables of brake shoes which decreases the expense of the bonding operation, requires comparatively little capital investment, substantially decreases the amount of time and labor required to perform a bonding operation, is highly suitable for high rates of production, and results in an improved adhesion of the linings to the tables of the brake shoes.

These and other objects, features and advantages of this invention will be apparent from the following detailed description, appended claims and accompanying drawings in which:

Figure 1:
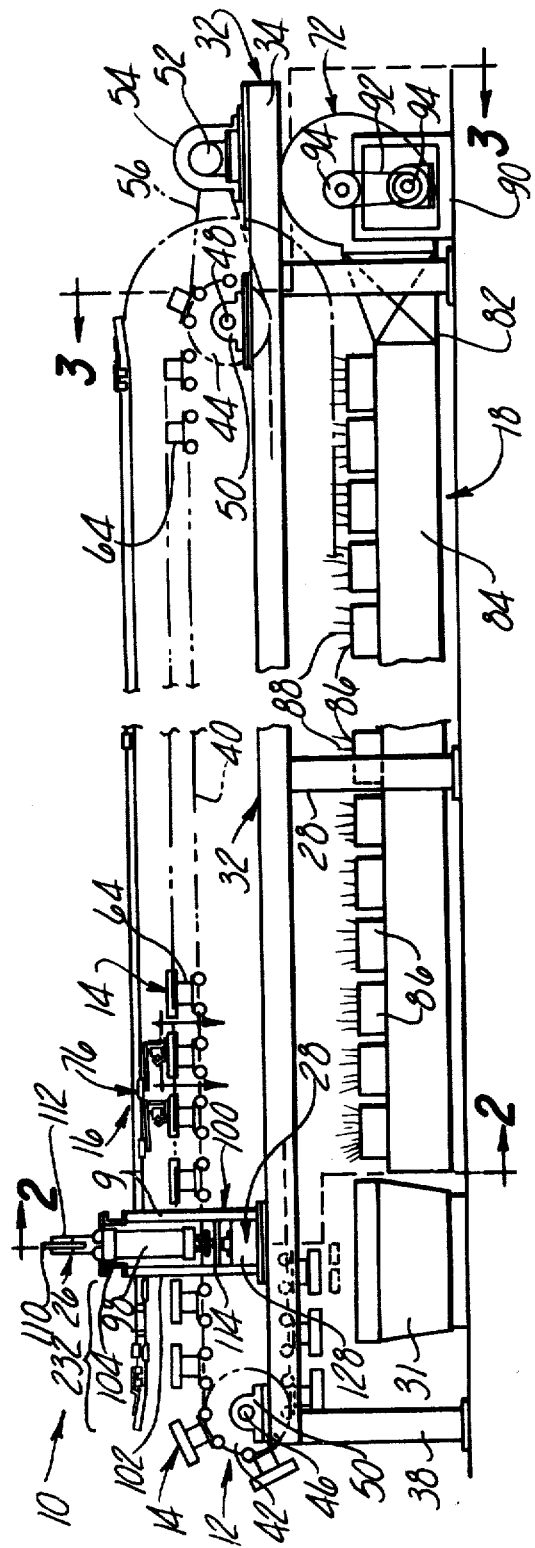
FIG. 1 is a side view of an apparatus embodying this invention.
Figure 2:
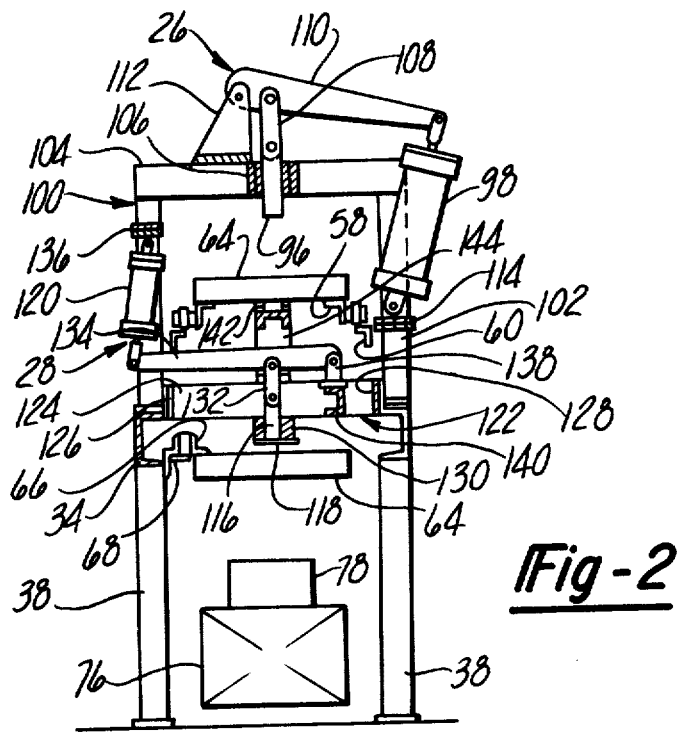
FIG. 2 is a sectional view taken generally on line 2—2 of FIG. 1.
Figure 3:
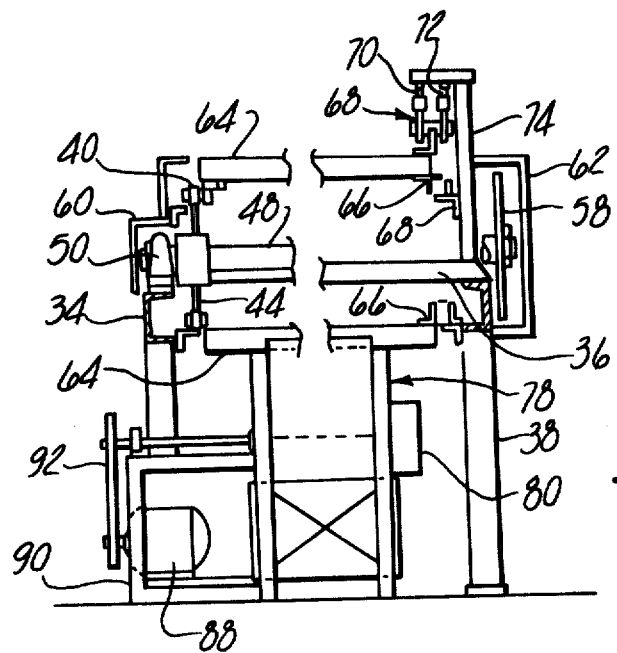
FIG. 3 is a fragmentary sectional view taken generally on line 3—3 of FIG. 1.
Figure 4:
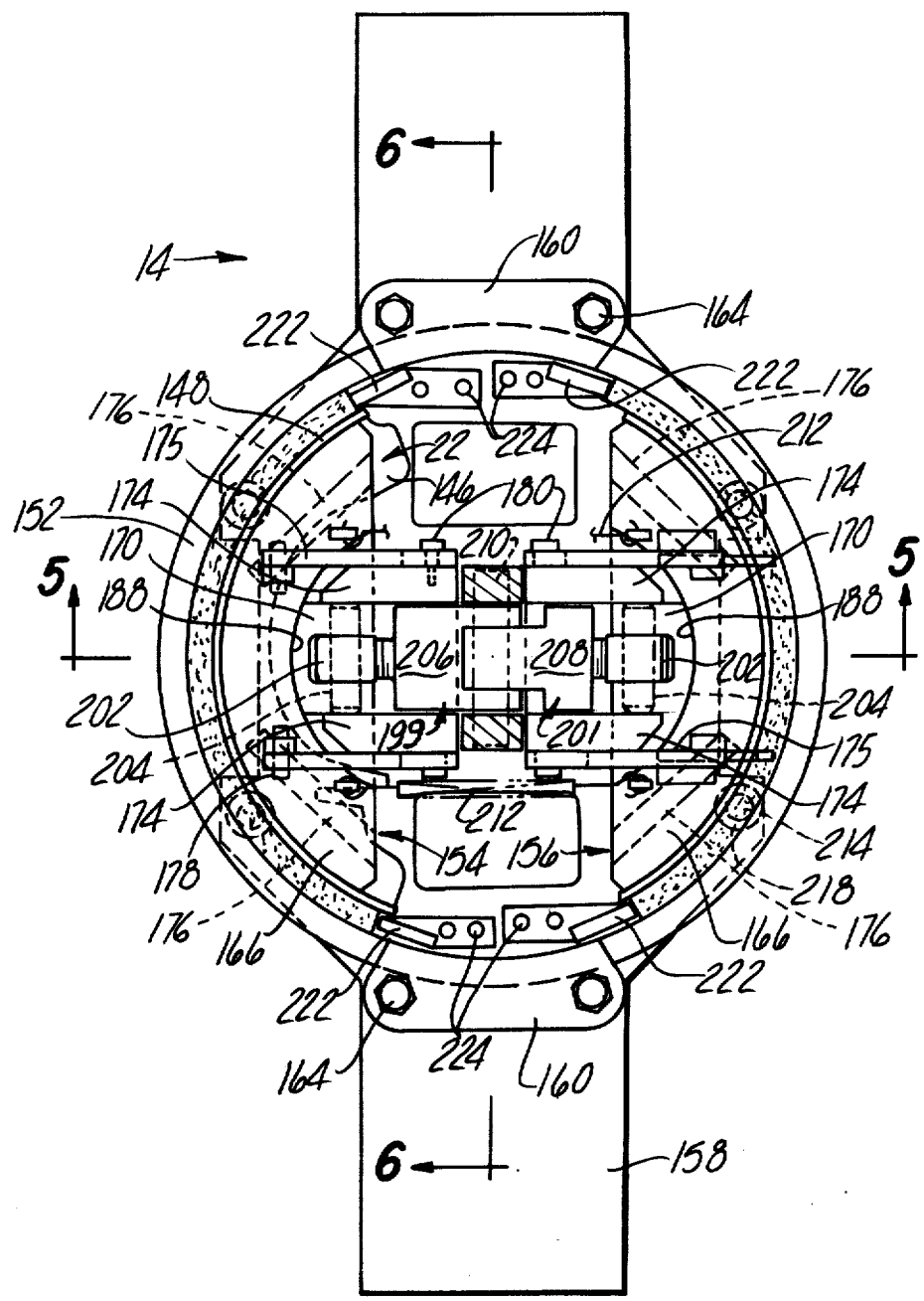
FIG. 4 is an enlarged view taken generally on line 4—4 of FIG. 1 and illustrating a fixture utilized in the apparatus of FIG. 1.

Referring in greater detail to the drawings, FIGS. 1 through 3 illustrate an apparatus 10 embodying this invention having a conveyor 12, a plurality of fixtures 14 thereon for applying pressure to liner and shoe assemblies received in the fixtures for bonding, a track assembly 16 for supplying electric current to the fixtures 14 for heating the bonding material, and an air duct assembly 18 for cooling heated brake shoes and fixtures. Each fixture 14 has a mechanism 20 (FIG. 5) for releasably clamping a pair of brake shoes 22 and linings 24 in the fixture. Apparatus 10 also has a press assembly 26 for actuating the clamping mechanism 20 of each fixture 14 and a press assembly 28 for both releasing the clamping mechanism 20 and actuating an ejector mechanism 30 of each fixture to eject the brake shoes with the linings bonded thereto from the fixture and into a tub 31.

Conveyor 12 has a frame 32 with laterally spaced apart longitudinally extending rails 34 connected together by cross members 36 and supported by a plurality of legs 38. A pair of conveyor roller chains 40 (only one of which is shown) extend generally longitudinally of frame 32 and are received on a pair of laterally spaced apart idler sprockets 42 and drive sprockets 44 respectively secured to shafts 46 and 48 received for rotation in journals 50 secured to frame 32. Conveyor roller chains 40 are driven by an electric motor 52 through a speed reducer and frictional clutch 54 the output shaft of which is connected by a drive chain 56 to a sprocket 58 secured to shaft 48. Suitable protective guards 60 and 62 (shown only in FIG. 3) overlie and shield both roller chains 40 and drive chain 56. Each fixture 14 is mounted on a tubular carrier beam 64 which extends transversely between the roller chains 32 and is connected by bracket 66 to a pair of rollers on each chain, which rollers when traveling between the sprockets roll on and are supported by channel iron rails 68 as shown in FIGS. 2 and 3.

Track assembly 16 for supplying electric current to each fixture 14 has two shielded current carrying bars 70 and 72 which are supported on frame 32 by brackets 74 and are releasably engaged by current carrying follower assemblies 76 one of which is associated with each fixture 14 and mounted on carrier beams 64. This current track and follower system is sold under the trade name "Duct-O-Bar" by the Duct-O-Wire Company of Waukesha, Wis., U.S.A.

Air cooling assembly 18 has a blower 78 with inlet 80 opening to ambient air and an outlet 82 connected to a duct 84 underlying and extending generally longitudinally of the lower run of the conveyor 12. Duct 84 has a plurality of discharge outlets 86 directing a stream of air 88 generally vertically upward around and over the fixtures 14 carried by the conveyor. Blower 78 is driven by an electric motor 88 received in a housing 90 and connected to the blower by belts 92 and pulleys 94 shielded by an appropriate protective guard (not shown).

Press assembly 26 has a plunger 96 actuated by a pneumatic cylinder 98 carried by a frame 100 having four upright posts 102 and two headers 104. Plunger 96 is slidably received in a bushing block 106 fixed to the headers 104 and is pivotally connected by a double ended clevice 108 to an intermediate portion of a lever arm 110. Lever arm 110 is pivotally connected at one end to a mounting bracket 112 fixed to headers 104 and pivotally connected at the other end to the piston rod of cylinder 98 which is pivotally connected to a bracket 114 fixed to posts 102.

Press assembly 28 has a plunger 116 with an ejector plate 118 fixed to the lower end thereof which is actuated by a cylinder 120 carried by a generally rectangular frame 122 having spaced apart cross rails 124 fixed to end plates 126 and 128 secured to upright posts 102. Plunger 116 is slidably received in a bushing block 130 fixed to cross rails 124 and is pivotally connected by a double-ended clevice 132 to an intermediate portion of an actuator arm 134 pivotally connected at one end to the piston rod of cylinder 120 which is pivotally connected to a bracket 136 fixed to posts 102. The other end of arm 134 is pivotally connected to a bracket 138 secured to a channel member 140 fixed to cross rails 124. When clamp mechanism 20 of a fixture 14 is being expanded by press assembly 26 the fixture and underlying carrier beam 64 of the conveyor is supported by longitudinally extending rails 142 fixed to posts 144 secured to cross rails 124.

As shown in FIGS. 4 through 7, a pair of brake shoes 22 and linings 24 to be bonded together are received and releasably clamped in each fixture 14. Each brake shoe 22 has a mounting plate 146 fixed to a table 148 of suitable curvature and transverse width with a bonding material 150 interposed between the table and the lining. The linings and tables are releasably clamped together in fixture 14 with substantial force between a pressure ring 152 and heater and load block assemblies 154 and 156 extended and retracted by mechanism 20.

To prevent the clamping forces from always being applied to the same segment of ring 152, it is mounted on a base plate 158 by retainer plates 160, spacers 162 and bolts 164 to permit rotation of the ring with respect to the block assemblies 154 and 156. To equalize the clamping force applied to the brake shoes and liners received in the fixture, this mounting also permits ring 153 to shift slightly generally radially with respect to block assemblies 154 and 156. Each block assembly has an auxiliary block 166 and a base block 168 slidably carried by a bracket 170 secured to base plate 158 by cap screws 172 and having retainer arms 174 extending over a portion of the base block. To heat the bonding material each block 166 and 168 has two electric heater rods 176 received in bores therein. To transmit both force and heat to a table 148 of a shoe 22 the outer end face of each block 166 and 168 has an arcuate surface contoured to engage and bear on the inner face of table 148 of a brake shoe 22.

Figure 5:
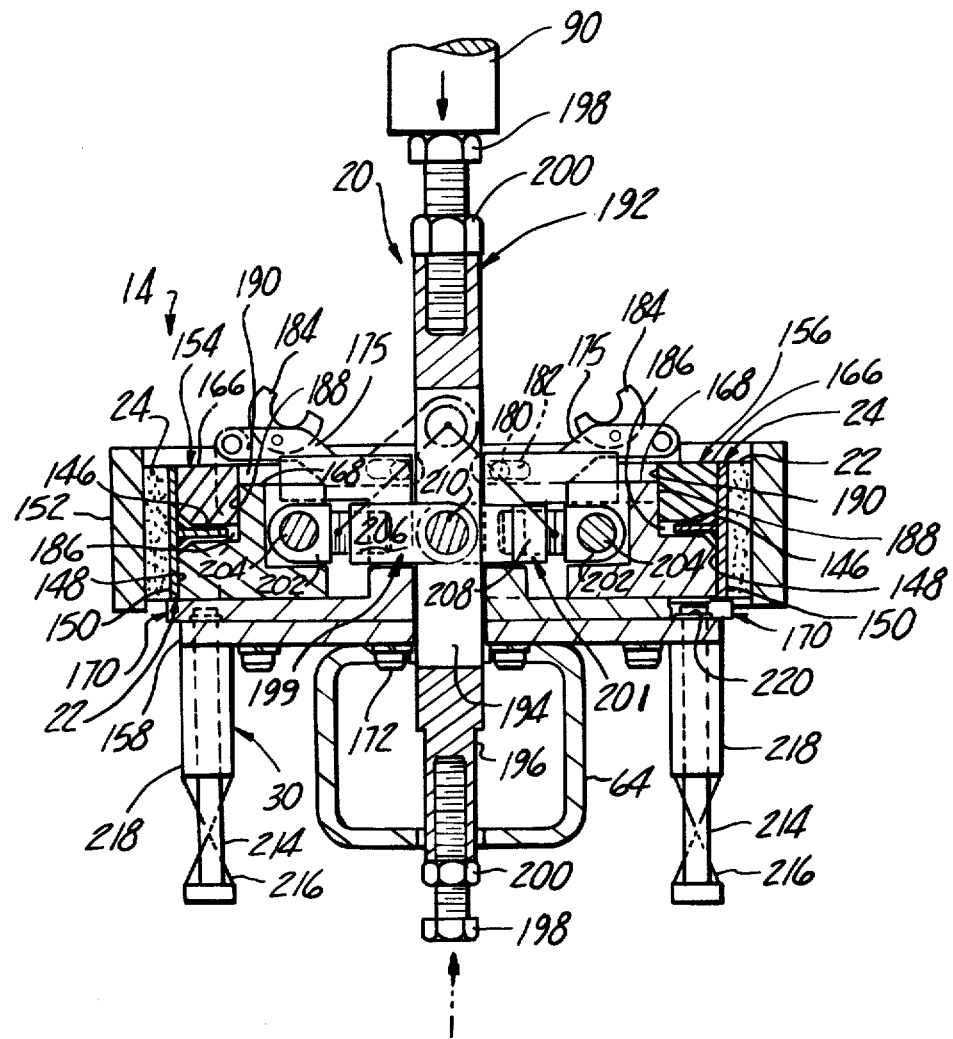
FIG. 5 is a sectional view taken on line 5—5 of FIG. 4.
Figure 6:
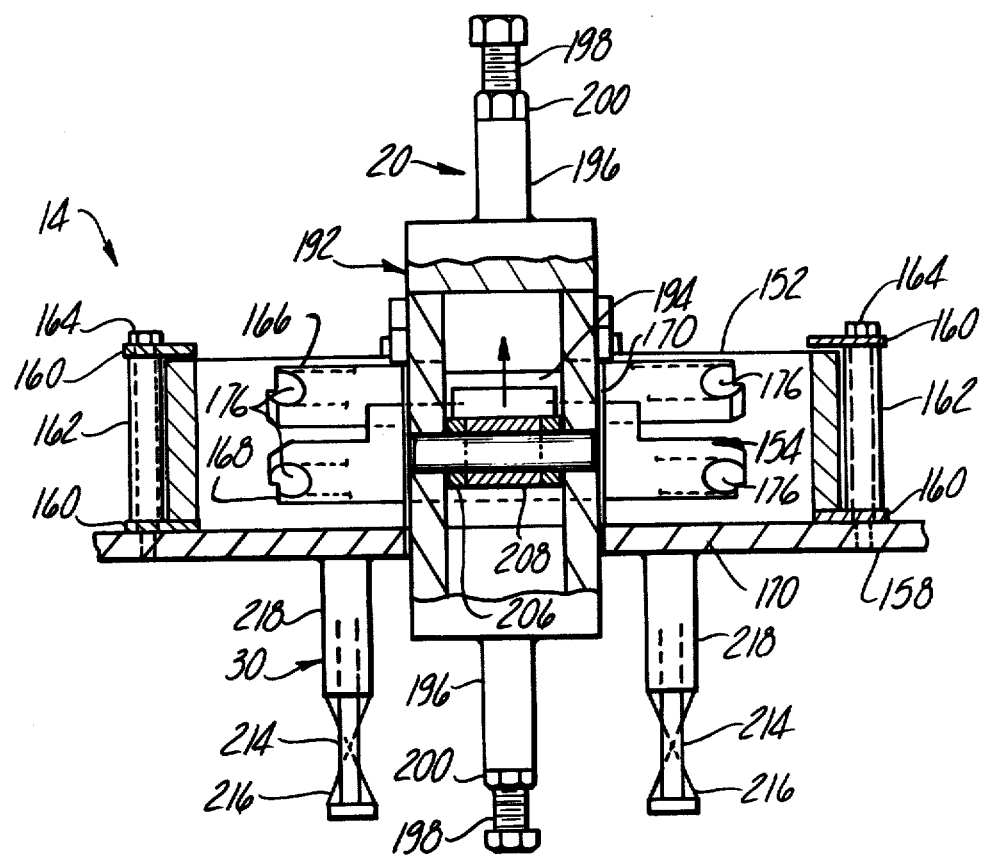
FIG. 6 is a sectional view taken on lines 6—6 of FIG. 4.

To permit brake shoes to be inserted generally axially into and removed from fixture 14, each block 166 is mounted so that it can be swung from the position shown in solid line in FIG. 5 to the position shown in phantom line. Block 166 is movably mounted on bracket 170 by a pair of links 175 pivotally connected adjacent one end to the block 178 and pivotally and slidably connected adjacent the other end to arms 174 by screws 180 received in slots 182 in the other end of the links. Each block 166 is releasably retained in its raised or phantom line position by a permanent magnet 184 attracted to mechanism 20 and pivotally connected to a link 176.

To permit blocks 166 and 168 of each assembly to be forced in unison into engagement with a table 148 of a brake shoe 22 and to provide clearance for the mounting plate 146 of the brake shoe, each base block 168 has a recess 186 therein with an upstanding generally arcuate surface 188 complimentary with and bearing on a corresponding surface 190 on the rear portion of auxiliary block 166. Block assemblies 154 and 156 are extended and retracted in unison by mechanism 20 which has a generally axially extending actuator member 192 with a central yoke having a slot 194 therethrough and a pair of axial aligned studs 196 on the opposed end thereof each having a bolt 198 threaded therein with a jam nut 200 thereon. Actuator 192 is pivotally connected to blocks 166 and 168 by adjustable arms 199 and 201 each having a first portion 202 pivotally connected to a block by a pin 204 and adjustably threaded into interfitting clevice and tang portions 206 and 208 respectively, which are received in slot 194 of actuator 192 and pivotally connected thereto by a pin 210. Block assemblies 154 and 156 are yieldably urged toward each other by a pair of tension springs 212 the ends of which are connected to the blocks 166.

Ejector assembly 30 has four ejector pins 214 each extending through a compression spring 216 and a bushing 218 and being retained in the bushing by a clip 220 received on the free end of the pin. Each pin 214 extends generally axially and is positioned to bear on one of the brake shoes when extended through the bushing whcih is fixed to the base plate 158. Brake linings are positioned in fixture 14 between positive stops 222 adjustably secured to base 158 by cap screws 224.

The temperature to which the bonding material 150 is heated by heater elements 176 is controlled by a thermocouple 226 engaging one of the blocks 168 and connected to a high-low temperature controller 228 which changes the state of a contactor 230 to turn on and off the current supplied to the heater elements 176 through the track 16 and the follower 76 associated with each fixture. The heater elements 176, contactor 230, and follower 76 are electrically connected by appropriate wires (not shown).

In using apparatus 10 blower assembly 18 is energized and current is supplied to collector track 16 for the heater elements of the fixtures, the temperature controllers of which are set to the temperature needed for curing the bonding material 150. Conveyor 12 is cycled so that it momentarily pauses or stops as each fixture 14 passes under the clamp press assembly 26 which also positions another fixture 14 directly under the clamp release and ejector press assembly 28. As each fixture 14 is moved by conveyor 12 into the loading zone 232 adjacent the left hand end (FIG. 1) of the conveyor its block assemblies 154 and 156 are retracted and auxiliary blocks 166 are releasably retained by magnets 184 in a position adjacent actuator 192 and away from the base blocks 168. In loading zone 232 an operator inserts a pair of brake linings 24 with a bonding material 150 on the rear face thereof and a pair of brake shoes 22 into each fixture and then swings the auxiliary blocks 166 down behind the tables 148 of the brake shoes.

As each loaded fixture 14 pauses under press assembly 26, the clamp mechanism 20 of the fixture is actuated by the press to clamp the brake linings and tables of the shoes securely together. Press assembly 26 is cycled by energizing air cylinder 98 to retract its piston rod and thereby extend plunger 96 to engage the upper end of actuator 192 and move it downwardly (as shown in FIG. 5) thereby moving block assemblies 154 and 156 generally radially outwardly to clamp the brake liners 24 and tables 148 of the shoes together under substantial pressure between the block assemblies and the ring 152. Thereafter air cylinder 98 is energized to retract plunger 96.

As each loaded and clamped fixture 14 is advanced along the upper run of conveyor 12 an electric current is supplied to the heater elements 176 of the fixture through track 16 and follower 76 to heat the bonding material 150 to its curing temperature while the brake shoes and liners are firmly clamped together in the fixture. The heat produced by heater elements 176 is transferred to the bonding material 156 principally by conduction through the block assemblies 154 and 156, and the tables 148 of the shoes. Block assemblies 154 and 156 are of a material such as steel having good thermal conductivity. The temperature of the blocks is sensed by the thermocouple 226 and maintained within predetermined limits by the controller 228 which is set to the desired temperature.

As each fixture 14 begins to pass around the drive-end of conveyor 12 it is electrically disconnected from track 16 and thus both the fixture and the brake shoes therein begin to cool. As the loaded fixtures advance along the lower run of the conveyor they pass through a stream of cool air 88 produced by blower assembly 18 which hastens the cooling of the brake shoes in the fixtures on the lower run of the conveyor. The stream of air 80 which is heated by passing around such fixtures, also moves upwardly over the fixtures on the upper run of the conveyor which are still being heated by heater elements 176 to thereby decrease the heat lost to the atmosphere from the fixtures being heated. This stream of air heated by the fixtures may also be used to contribute to heating of the building in which apparatus 10 is used.

Figure 7:
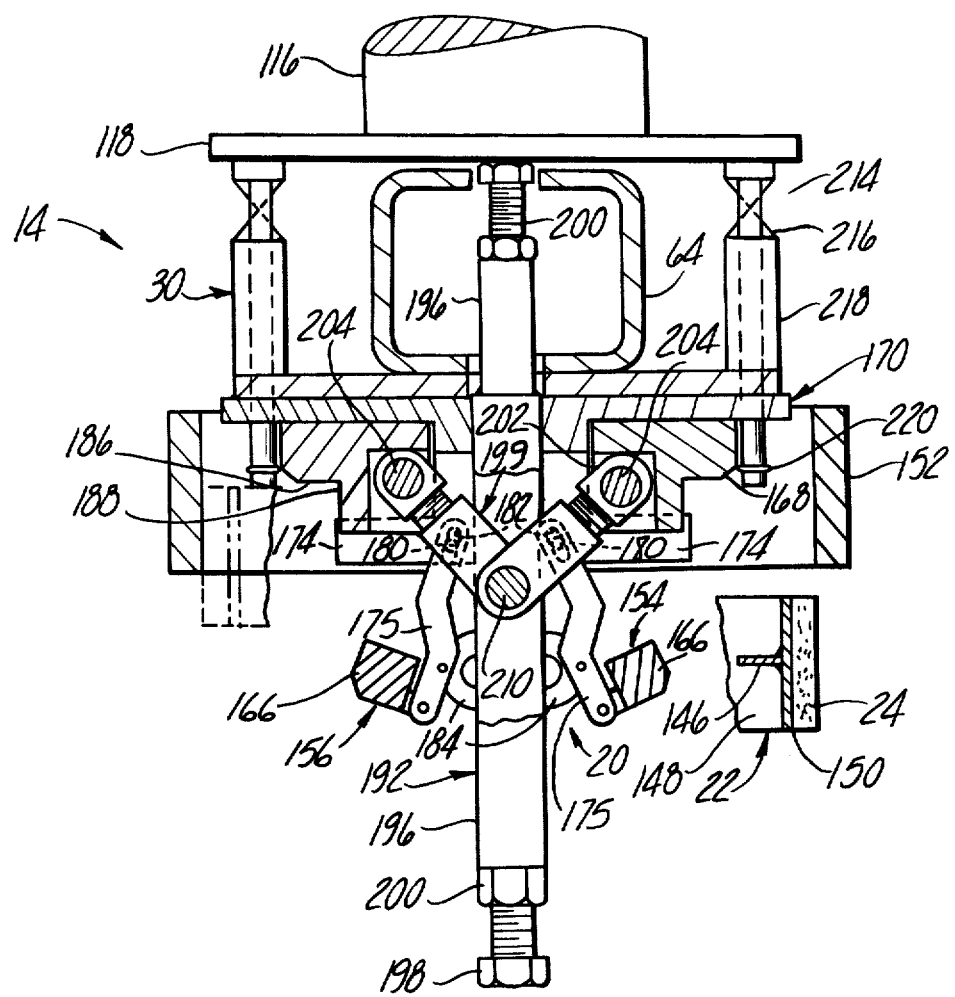
FIG. 7 is a sectiona view of the fixture of FIG. 4 illustrating removal from the fixture of brake shoes with linings bonded thereon.

After each fixture has been substantially cooled by a stream of air 80, it pauses under press assembly 28 which releases clamping mechanism 20 and actuates ejectors 30 to remove the pair of brake shoes with the linings bonded thereto from the fixture and deposit them in tub 31 (as shown in FIG. 1). Press 28 is cycled by energizing cylinder 120 to extend its piston and thereby move ejector plate 118 downward (as shown in FIG. 7) to engage and end of actuator 190 and move it downward to disengage and retract blocks 168 from the brake shoes and to move ejector pins 214 downward to dislodge the brake shoes 22 from the fixture if they have not fallen out due to the force of gravity. Thereafter cylinder 120 is energized to retract plunger 116 and ejector plate 118.

When block assemblies 154 and 156 are retracted by mechanism 20, auxiliary blocks 166 swing downwardly and away from base blocks 168 and the brake shoes so that magnets 184 engage actuator 192 and retain blocks 166 in the position shown in FIG. 7. Blocks 166 usually swing to this lower position due to the force of gravity but if they do not do so, they are forced toward this position by the ejection of brake shoes 22 from the fixture. The empty fixtures 14 with the block assemblies 154 and 156 retracted and blocks 166 retained adjacent actuator 192 are moved by the conveyor 12 to the loading station 232 where they are again right side up and ready for loading with another pair of brake shoes and liners to be bonded together.

Figure 8:
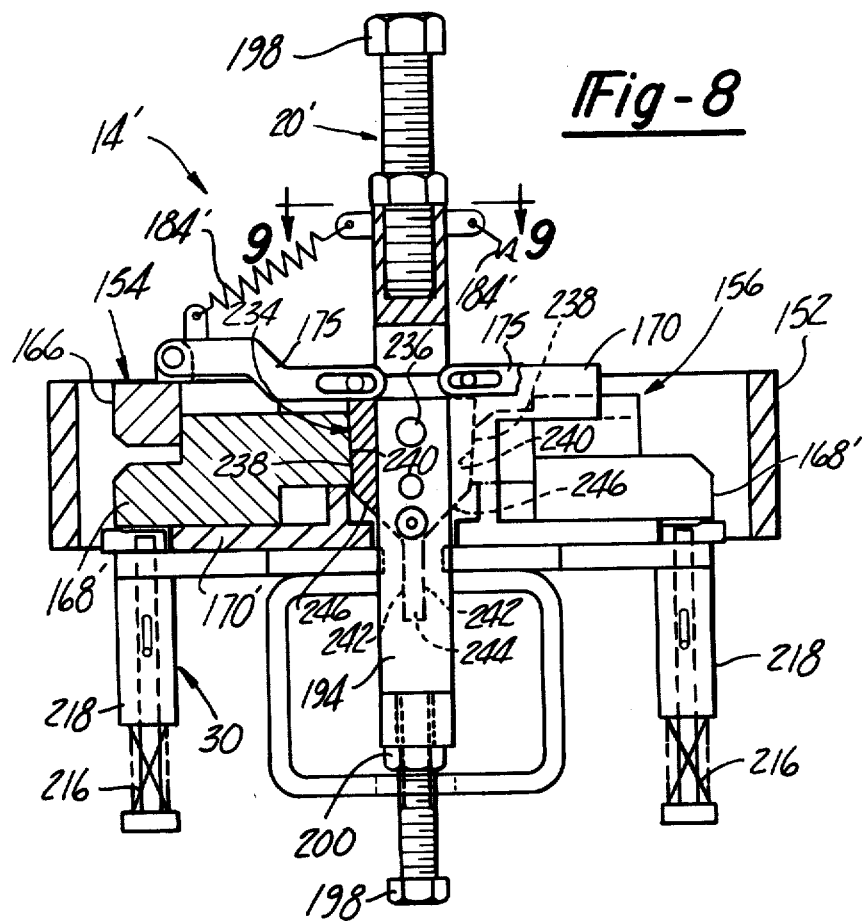
FIG. 8 is a sectional view of a modified fixture utilized in the apparatus of FIG. 1.
Figure 9:
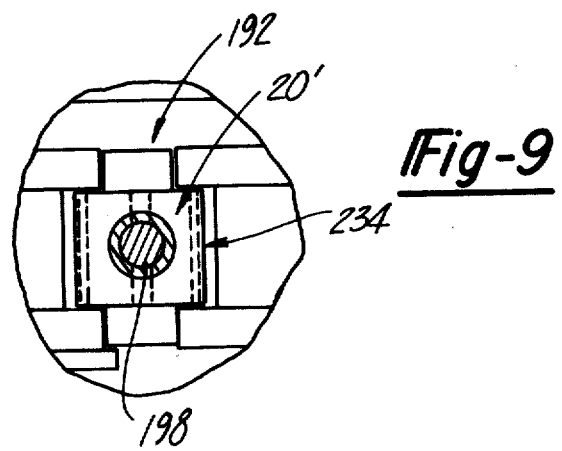
FIG. 9 is a fragmentary view taken on line 9—9 of FIG. 8.

FIGS. 8 and 9 show a modified fixture 14' which is the same as fixture 14 except that clamping mechanism 20' uses a wedge arrangement to extend and retract the block assemblies 154 and 156. Actuator member 192 has a wedge block 234 retained therein by a pin 236 and having a pair of wedge faces 238 inclined at a locking angle and bearing on a complimentary face 240 on the rear of each lower block 168' of the block assemblies.

When clamp mechanism 20 is released and block assemblies 154 and 156 are fully retracted the inclined faces 238 of blocks 168' bear on opposed faces 242 of a depending tang 244 of the wedge block. The rapid advance and retraction of the block assemblies is controlled by a pair of inclined faces 246 on wedge block 234 extending between and steeply inclined to faces 238 and 242.

When the wedge arrangement of clamping mechanism 20' of fixtures 14' is actuated by press assembly 26 the brake linings and tables of the shoes in each fixture 14' are clamped together with a force of essentially the same magnitude even though the thickness of the brake linings and/or tables varies slightly from one set to another. The clamping force is of the same magnitude even though the thickness of the liners and shoes varies because press assembly 26 is driven by a pneumatic cylinder and hence applies the same force on each cycle to plunger 198 and to wedge block 234 which transmits the force to block assemblies 154 and 156 in a fixed ratio regardless of the thickness of the brake liners and tables being clamped. Thus, whenever such an essentially uniform clamping force is desired fixtures 14' are preferred to fixtures 14 for use in apparatus 10. Fixture 14' also has tension springs 184' in lieu of magnets 184 to yieldably retain blocks 166 in their raised positions.

In practice, fixtures 14 and 14' have been successfully used to bond brake linings 24 to the tables 148 of brake shoes 22 of low carbon steel with bonding materials 150 such as Chrysler K1035 manufactured by the Chrysler Corporation of Detroit, Mich. and Goodrich 605 manufactured by the B. F. Goodrich Tire & Rubber Company.

The clamp mechanism 20 or 20' of the fixture applied a pressure in the range of about 1000 to 2000 pounds per square inch of the interface of the linings with the tables of the shoes and the bonding material was heated by the fixtures to a temperature in the range of about 375° F. to 500° F. to cure the bonding material. These bonding materials have the characteristic that once heated to their curing temperature they will thereafter cure even if they are not maintained at or above such curing temperature for a substantial period of time. The fixtures with the shoes and liners clamped therein were cooled by directing a stream of air at ambient temperature over the fixtures. The heated brake linings and shoes were cooled down to 250° F. to 300° F. before being released from the fixtures to assure a complete bonding and tenacious adherence of the liners to the shoes.

I claim:

1. An apparatus for bonding brake linings to tables of brake shoes with an application of heat and pressure which comprises: a load ring constructed and arranged to encircle a pair of generally opposed brake shoes and brake linings received between the ring and the shoes and aligned to be bonded to the tables of the shoes, a pair of pressure blocks received within said ring in spaced apart generally opposed relation to each other and each constructed and arranged to bear on at least a substantial portion of the surface of the inner face of the table of one of the brake shoes received within the pressure ring, at least a portion of each pressure block bearing on the rear face of the table of a brake shoe being of a material having good thermal conductivity, actuator means operably associated with said blocks and constructed and arranged to force said blocks generally radially outwardly to apply sufficient force to the brake shoes to urge the tables of the brake shoes and the linings firmly together, said blocks and said ring being constructed and arranged to permit rotation of one relative to the other when said blocks are retracted with respect to said ring, and heating means operably associated with each of said pressure blocks and constructed and arranged to transfer heat by conduction through the tables of said brake shoes to heat a bonding material received between the brake linings and the tables of the shoes to an elevated curing temperature.

2. The apparatus of claim 1 wherein each of said blocks has first and second portions constructed and arranged to receive a mounting plate of the brake shoe therebetween and each bearing on only a portion of the transverse width of the table of the brake shoe.

3. The apparatus of claim 1 which also comprises a plurality of ejectors carried by the apparatus and constructed and arranged such that when said blocks are retracted said ejectors may be extended generally axially with respect to said ring to displace brake shoes generally axially from between said ring and said retracted blocks.

4. The apparatus of claim 1 wherein said actuator means comprises a toggle joint having an actuator member extending generally axially through said ring and at least two arms each connected to said actuator member and one of said blocks and constructed and arranged such that movement of said actuator member generally axially in one direction with respect to said ring moves said blocks generally radially outwardly toward said ring and movement of said actuator member in the other generally axial direction with respect to said ring moves said blocks generally radially inwardly away from said ring and toward each other.

5. An apparatus for bonding brake linings to tables of brake shoes with an application of heat and pressure which comprises: a load ring constructed and arranged to encircle a pair of generally opposed brake shoes and brake linings received between the ring and the shoes and aligned to be bonded to the tables of the shoes, a pair of pressure blocks received within said ring in spaced apart generally opposed relation to each other and each constructed and arranged to bear on at least a substantial portion of the surface of the inner face of the table of one of the brake shoes received within the pressure ring, at least a portion of each pressure block bearing on the rear face of the table of a brake shoe being of a material having good thermal conductivity, actuator means operably associated with said blocks and constructed and arranged to force said blocks generally radially outwardly to apply sufficient force to the brake shoes to urge the tables of the brake shoes and the linings firmly together, each of said pressure blocks has separable first and second portions constructed and arranged to receive a mounting plate of the brake shoe therebetween and to each bear on the table of the brake shoe on only one side of the mounting plate of the brake shoe, said portions of each pressure block being constructed and arranged so that said first portion is movable with respect to said second portion such that said first portion can be moved to a first position allowing sufficient clearance to permit the brake shoe and lining to be inserted generally axially between said load ring and the second portion of said block when said blocks are retracted and to a second position wherein both said first and second portions will bear on the table of the brake shoe with the mounting plate received therebetween when said actuator means is expanded to move both of said blocks generally radially outwardly to urge the tables of the brake shoes and the linings firmly together and heating means operably associated with each of said pressure blocks and constructed and arranged to transfer heat by conduction through the tables of said brake shoes to heat a bonding material received between the brake linings and the tables of the shoes to an elevated curing temperature.

6. The apparatus of claim 5 which also comprises a plurality of ejectors carried by the apparatus and constructed and arranged such that when said blocks are retracted said ejectors may be extended generally axially with respect to said ring to displace brake shoes generally axially from between said ring and said retracted blocks.

7. The apparatus of claim 5 which also comprises spring means constructed, arranged and operably associated with said first portions of said blocks to releasably retain each of said first portions in its said first position.

8. The apparatus of claim 7 which also comprises a link operably connected to said first portion of one of said blocks, carried by the apparatus, and constructed and arranged to guide the movement of said first portion to its said first and second positions.

9. The apparatus of claim 5 wherein said actuator means is connected to only one of said first and second portions of each of said pressure blocks, and said first and second portions of each of said pressure blocks are constructed and arranged to bear on each other such that when said actuator means moves said blocks to urge the tables of the brake shoes and the linings firmly together both the first and second portions of each of said blocks bears on the table of its associated brake shoe.

10. The apparatus of claim 9 wherein said heating means comprises at least one electric heater element disposed in each of said first and second portions of each of said blocks.

11. The apparatus of claim 9 wherein said blocks and said ring are constructed and arranged to permit rotation of one relative to the other when said blocks are retracted with respect to said ring.

12. The apparatus of claim 9 which also comprises a plurality of ejectors carried by the apparatus and constructed and arranged such that when said blocks are retracted said ejectors may be extended generally axially with respect to said ring to displace brake shoes generally axially from between said ring and said retracted blocks.

13. The apparatus of claim 9 wherein said actuator means comprises a toggle joint having an actuator member extending generally axially through said ring and at least two arms each connected to said actuator member and one of said blocks and constructed and arranged such that movement of said actuator member generally axially in one direction with respect to said ring moves said blocks generally radially outwardly toward said ring and movement of said actuator member in the other generally axial direction with respect to said ring moves said blocks generally radially inwardly from said ring and toward each other.

14. The apparatus of claim 9 which also comprises a spring means constructed, arranged and operably associated with said first portions of said blocks to releasably retain each of said first portions in its said first position.

15. The apparatus of claim 14 which also comprises a link operably connected to said first portion of one of said blocks, carried by the apparatus, and constructed and arranged to guide the movement of said first portion to its said first and second positions.

16. The apparatus of claim 9 wherein said heating means comprises at least one electric heater element received in each of said blocks, and the apparatus also comprises a conveyor constructed and arranged to move a plurality of fixtures each comprising an assembly of said ring, blocks, heater means, and actuator means along a continuous loop having generally horizontally extending generally and upper and lower runs with the upper run overlying and being generally vertically spaced above the lower run, conductor means constructed and arranged to supply an electric current to said heater elements of said fixtures to bring the temperature of a bonding material received between the liners and the tables of the brake shoes in said fixtures to at least its curing temperature while the conveyor moves said fixtures along a substantial portion of the upper run, and air cooling means constructed and arranged to direct from below the lower run of the conveyor a stream of cool air generally vertically upward over the fixtures while the conveyor moves said fixtures along a substantial portion of the lower run underlying the portion of the upper run through which the brake shoes are heated by said heater means so as to both cool the heated fixtures and the brake shoes received therein and to direct the stream of air warmed by passing over the heated fixtures moving along the lower run over the fixtures moving along the portion of the upper run directly overlying the stream of air so as to decrease the amount of heat transferred to the surrounding ambient atmosphere by the fixtures to which electric current is being supplied to their heater elements as they are moved along a portion of the upper run by the conveyor.

17. The apparatus of claim 16 which also comprises release means constructed and arranged to move the actuator means to retract said blocks of a fixture when such fixture is on the lower run of said conveyor and has already moved along at least a substantial portion of the cooling means so that the brake shoes with the liners bonded thereto may drop generally downwardly out of the fixture.

18. The apparatus of claim 17 which also comprises release means constructed and arranged to move the actuator means to retract said blocks of a fixture when such fixture is on the lower run of said conveyor and has already moved along at least a substantial portion of the cooling means so that the brake shoes with the liners bonded thereto may drop generally downwardly out of the fixture.

19. The apparatus of claim 18 which also comprises clamp means overlying the upper run of said conveyor and constructed and arranged to move the actuator means to extend said blocks of a fixture generally radially outward to urge the liners and tables of the shoes firmly together while such fixture still has to travel along at least a substantial portion of the upper run during which an electric current is supplied to the heater elements of such fixture to heat the bonding material to at least its curing temperature.

20. The apparatus of claim 9 which also comprises release means constructed and arranged to move the actuator means to retract said blocks of a fixture when such fixture is on the lower run of said conveyor and has already moved along at least a substantial portion of the cooling means so that the brake shoes with the liners bonded thereto may drop generally downwardly out of the fixture.

21. The apparatus of claim 19 which also comprises clamp means overlying the upper run of said conveyor and constructed and arranged to move the actuator means to extend said blocks of a fixture generally radially outward to urge the liners and tables of the shoes firmly together while such fixture still has to travel along at least a substantial portion of the upper run during which an electric current is supplied to the heater elements of such fixture to heat the bonding material to at least its curing temperature.

22. An apparatus for bonding brake linings to tables of brake shoes with an application of heat and pressure which comprises: a load ring constructed and arranged to encircle a pair of generally opposed brake shoes and brake linings received between the ring and the shoes and aligned to be bonded to the tables of the shoes, a pair of pressure blocks received within said ring in spaced apart generally opposed relation to each other and each constructed and arranged to bear on at least a substantial portion of the surface of the inner face of the table of one of the brake shoes received within the pressure ring, at least a portion of each pressure block bearing on the rear face of the table of a brake shoe being of a material having good thermal conductivity, actuator means operably associated with said blocks and constructed and arranged to force said blocks generally radially outwardly to apply sufficient force to the brake shoes to urge the tables of the brake shoes and the linings firmly together, heating means operably associated with each of said pressure blocks and constructed and arranged to transfer heat by conduction through the tables of said brake shoes to heat a bonding material received between the brake linings and the tables of the shoes to an elevated curing temperature, said heating means comprises at least one electric heater element received in each of said blocks, a conveyor constructed and arranged to move a plurality of fixtures each comprising an assembly of said ring, blocks, heater means, and actuator means along a continuous loop having generally horizontally extending upper and lower runs with the upper run overlying and being generally vertically spaced above the lower run, conductor means constructed and arranged to supply an electric current to said heater elements of said fixtures to bring the temperature of a bonding material received between the liners and the tables of the brake shoes in said fixtures to at least its curing temperature while the conveyor moves said fixtures along a substantial portion of the upper run, and air cooling means constructed and arranged to direct from below the lower run of the conveyor a stream of cool air generally vertically upward over the fixtures while the conveyor moves said fixtures along a substantial portion of the lower run underlying the portion of the upper run through which the brake shoes are heated by said heater means so as to both cool the heated fixtures and the brake shoes received therein and to direct the stream of air warmed by passing over the heated fixtures moving along the lower run over the fixtures moving along the portion of the upper run directly overlying the stream of air so as to decrease the amount of heat transferred to the surrounding ambient atmosphere by the fixtures to which electric current is being supplied to their heater elements as they are moved along a portion of the upper run by the conveyor.

23. The apparatus of claim 22 wherein said means producing a stream of cool air comprises an air duct having a plurality of outlets underlying at least a portion of the lower run of the conveyor and opening generally vertically upwardly, and a blower having an ambient air inlet and an outlet for discharging air at an ambient temperature into said duct.

* * * * *